United States Patent
Gillen

(10) Patent No.: US 9,752,068 B2
(45) Date of Patent: Sep. 5, 2017

(54) HOT MELT PRESSURE SENSITIVE ADHESIVE AND THERMOSET COMPRISING STYRENE-BUTADIENE POLYMERS HAVING HIGH VINYL AND HIGH DI-BLOCK

(71) Applicant: Kraton Polymers U.S. LLC, Houston, TX (US)

(72) Inventor: Jason Drew Gillen, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 14/586,079

(22) Filed: Dec. 30, 2014

(65) Prior Publication Data

US 2015/0191637 A1   Jul. 9, 2015

Related U.S. Application Data

(60) Provisional application No. 61/923,934, filed on Jan. 6, 2014.

(51) Int. Cl.

| | |
|---|---|
| *C09J 193/04* | (2006.01) |
| *C09J 125/02* | (2006.01) |
| *C09J 125/06* | (2006.01) |
| *C09J 171/02* | (2006.01) |
| *C09J 153/02* | (2006.01) |
| *C09J 171/12* | (2006.01) |
| *C09J 191/00* | (2006.01) |
| *C08L 91/00* | (2006.01) |
| *C08L 93/04* | (2006.01) |

(52) U.S. Cl.
CPC ........... *C09J 193/04* (2013.01); *C09J 125/02* (2013.01); *C09J 125/06* (2013.01); *C09J 153/02* (2013.01); *C09J 171/02* (2013.01); *C09J 171/12* (2013.01); *C09J 191/00* (2013.01); *C08G 2170/20* (2013.01); *C08L 91/00* (2013.01); *C08L 93/04* (2013.01); *C08L 2205/025* (2013.01)

(58) Field of Classification Search
CPC .... C08L 53/02; C08L 2205/025; C08L 91/00; C08L 93/04; C09J 153/02; C09J 125/02; C09J 191/00; C09J 193/04
See application file for complete search history.

(56) References Cited

U.S. PATENT DOCUMENTS

| | | |
|---|---|---|
| RE27,145 E | 6/1971 | Jones |
| 3,686,366 A | 8/1972 | Winkler |
| 3,700,748 A | 10/1972 | Winkler |
| 3,985,830 A | 10/1976 | Fetters et al. |
| 4,039,593 A | 8/1977 | Kamienski et al. |
| 4,391,949 A | 7/1983 | St. Clair |
| 4,444,953 A | 4/1984 | St. Clair |
| 4,738,884 A * | 4/1988 | Algrim ............... E04D 1/26 428/198 |
| 5,194,535 A | 3/1993 | Koppes et al. |
| 6,492,469 B2 | 12/2002 | Willis et al. |
| 7,234,284 B2 * | 6/2007 | Paradise ............ C08L 95/00 156/72 |
| 2007/0112102 A1 * | 5/2007 | Kluttz ................ C08L 95/00 524/59 |
| 2010/0092703 A1 | 4/2010 | Fouquay et al. |

FOREIGN PATENT DOCUMENTS

| | | |
|---|---|---|
| CA | 716645 A | 8/1965 |
| EP | 0243956 B1 | 12/1991 |
| JP | 63182686 A | 7/1988 |
| KR | 20120104049 A * | 9/2012 |

OTHER PUBLICATIONS

KR 20120104049 A, Sep. 2012, Machine Transalation.*

* cited by examiner

*Primary Examiner* — Satya Sastri
(74) *Attorney, Agent, or Firm* — Ekatherina Serysheva

(57) ABSTRACT

The present invention provides methods and systems for a hot melt pressure sensitive adhesive and thermoset that comprises from about 5 to about 50 wt. % of a block copolymer, from about 0 to about 75 wt. % of a tackifying resin, from about 0 to about 45 wt. % of an oil, and from about 0 to about 3 wt. % of an antioxidant.

11 Claims, No Drawings

HOT MELT PRESSURE SENSITIVE ADHESIVE AND THERMOSET COMPRISING STYRENE-BUTADIENE POLYMERS HAVING HIGH VINYL AND HIGH DI-BLOCK

FIELD OF THE INVENTION

The present invention comprises a hot melt pressure sensitive adhesive composed of a block copolymer composition including a diblock copolymer (i) having one block of a monovinylaromatic hydrocarbon and one block of a conjugated diene and one or more block copolymers (ii) comprising at least two blocks of monovinylaromatic hydrocarbon and at least one block of conjugated diene.

More particularly the present invention concerns a hot melt pressure sensitive adhesives comprising block copolymer composition including a diblock copolymer (i) having one block of a monovinylaromatic hydrocarbon and one block of a conjugated diene and one or more block copolymers (ii) comprising at least two blocks of monovinylaromatic hydrocarbon and at least one block of conjugated diene, and at least one tackifying resin. The adhesives of the present invention have demonstrated exceptionally good adhesion to highly recycled corrugated board stock.

The advantages of the adhesives of the present invention are that they are lower in cost compared to poly(styrene-isoprene-styrene) based adhesives (SIS) while having comparable or better properties.

BACKGROUND OF THE INVENTION

Hot melt adhesives are known, for instance, in the JP 2001787 describing tacky adhesive compositions for tapes comprising a block copolymer of a vinylaromatic hydrocarbon and a high vinyl polybutadiene block. The composition comprises a block copolymer, a tackifying resin and at least one phenol compound. The block copolymer is composed of at least one polymeric block mainly containing butadiene. It has a vinylaromatic hydrocarbon content of 10-36% by weight and the butadiene portions have a vinyl content of 15-55%.

The JP 63182386 discloses tacky block copolymer compositions containing a vinylaromatic-butadiene block copolymer, a tackifying resin and a phenolic compound. The block copolymer is mainly composed of vinylaromatic hydrocarbon and at least one polymer block composed of polybutadiene.

The EP-A-0 243 956 discloses an adhesive composition comprising a block copolymer containing at least one vinylaromatic hydrocarbon block and one butadiene containing block, wherein the relationship between the vinylaromatic hydrocarbon block and the 1,2-vinyl content in the butadiene portion is within a ratio between 40 and 70. In addition, the polymers that have been used have a melt flow rate of 5 g/10 min. (200° C., 5 kg).

These hot melt compositions however do not have the same properties as those based on SIS in respect of tack, adhesive strength creep resistance and treatment capacity at high temperature.

The object of the invention is a hot melt adhesive composition having equal or better properties compared to prior art adhesives, especially poly(styrene-isoprene-styrene) (SIS) based adhesives.

Poly(styrene-butadiene-styrene) polymers are currently used in pressure sensitive adhesives despite their high viscosity, poor thermal stability, and poor processability. The main reason for this is their high viscosity and tendency to cross-link so that the processing step becomes a limiting factor. Surprisingly a block copolymer composition including a diblock copolymer (i) having one block of a monovinylaromatic hydrocarbon and one block of a conjugated diene and one or more block copolymers (ii) comprising at least two blocks of monovinylaromatic hydrocarbon and at least one block of conjugated diene has been developed with molecular parameters suitable for hot melt adhesive applications.

BRIEF SUMMARY OF THE INVENTION

According to the present invention, there is provided hot melt pressure sensitive adhesives comprising a block copolymer composition including a diblock copolymer (i) having one block of a monovinylaromatic hydrocarbon and one block of a conjugated diene and one or more block copolymers (ii) comprising at least two blocks of monovinylaromatic hydrocarbon and at least one block of conjugated diene and at least one tackifying resin.

More particularly, there is provided a hot melt pressure adhesive, comprising:
  a) a block copolymer composition comprising (i) a diblock copolymer comprising one block of a monovinylaromatic hydrocarbon and one block of a conjugated diene having a peak molecular weight from 30,000 to 78,000 and a vinyl content from 35 to 80 mol percent based on the number of repeat monomer units in the conjugated diene block, and (ii) a block copolymer comprising at least two blocks of monovinylaromatic hydrocarbon and at least one block of conjugated diene, the block copolymer selected from the group consisting of linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the melt index for the block copolymer composition is from about 20 g/10 min. to about 35 g/10 min. as determined by ASTM D-1238, condition G (200° C., 5 kg) and wherein the ratio of (i) to (ii) in the block copolymer composition is greater than 1:1;
  b) from about 10 to about 75 wt. % of at least one tackifying resin;
  c) an optional oil; and
  d) an optional antioxidant.

According to yet another embodiment of the present invention, a holt melt pressure adhesive, comprising:
  a) from about 5 to about 50 wt. % of a block copolymer composition comprising (i) a diblock copolymer comprising one block of a monovinylaromatic hydrocarbon and one block of a conjugated diene having a peak molecular weight from 30,000 to 78,000 and a vinyl content from 35 to 80 mol percent based on the number of repeat monomer units in the conjugated diene block, and (ii) a block copolymer comprising at least two blocks of monovinylaromatic hydrocarbon and at least one block of conjugated diene, the block copolymer selected from the group consisting of linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the melt index for the block copolymer composition is from about 20 g/10 min. to about 35 g/10 min as determined by ASTM D-1238, condition G (200° C., 5 kg) and wherein the ratio of (i) to (ii) in the block copolymer composition is greater than 1:1;

b) from about 10 to about 75 wt. % of at least one tackifying resin;

c) an optional oil; and d) an optional antioxidant

According to yet another embodiment of the present invention, a holt melt pressure adhesive, comprising:

a) from about 20 to about 35 wt. % block copolymer composition comprising (i) a diblock copolymer comprising one block of a monovinylaromatic hydrocarbon and one block of a conjugated diene having a peak molecular weight from 30,000 to 78,000 and a vinyl content from 35 to 80 mol percent based on the number of repeat monomer units in the conjugated diene block, and (ii) a block copolymer comprising at least two blocks of monovinylaromatic hydrocarbon and at least one block of conjugated diene, the block copolymer selected from the group consisting of linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the melt index for the block copolymer composition is from about 20 g/10 min. to about 35 g/10 min. as determined by ASTM D-1238, condition G (200° C., 5 kg) and wherein the ratio of (i) to (ii) in the block copolymer composition is greater than 1:1;

b) from about 10 to about 75 wt. % of a tackifying resin selected from the group consisting of a rosin ester tackifier resin and a terpene tackifier resin;

c) an optional oil; and d) an optional antioxidant.

DETAILED DESCRIPTION OF THE INVENTION

The ranges set forth in this specification include not only each end number but also every conceivable number in between the end numbers, as this is the very definition of a range.

The present invention may be understood more readily by reference to the following detailed description of the invention. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Preferably, the block copolymer composition utilized in the present invention comprises a diblock copolymer, triblock copolymer, or a multiarm coupled block copolymer. While hydrogenation of block copolymers is well known in the art, the block copolymers of the present invention are in substantially unhydrogenated form. In one preferred embodiment of the present invention, the di-block copolymer is of the formula A-B, the triblock copolymer is of the formula A-B-A, and the multiarm coupled block copolymer is of the formula (A-B)nX, wherein A is a monovinyl aromatic hydrocarbon block, B is a conjugated diene block, n is an integer from 2 to 6 and X is the residue of a coupling agent.

While the monovinyl aromatic hydrocarbon block may be any monovinyl aromatic hydrocarbon known for use in the preparation of block copolymers such as styrene, o-methylstyrene, p-methylstyrene, p-tert-butylstyrene, 2,4-dimethylstyrene, alpha-methylstyrene, vinylnaphthalene, vinyltoluene and vinylxylene or mixtures thereof, the most preferred monovinyl aromatic hydrocarbon for use in the process of the present invention is styrene, which is used as a substantially pure monomer or as a major component in mixtures with minor proportions of other structurally related vinyl aromatic monomer(s) such as o-methylstyrene, p-methylstyrene, p-tert-butylstyrene, 2,4-dimethylstyrene, α-methylstyrene, vinylnaphthalene, vinyltoluene and vinylxylene, i.e., in proportions of at most 10% by weight of the monovinyl aromatic hydrocarbon block. The use of substantially pure styrene is most preferred in the present process.

Similarly, the conjugated diene block may be any conjugated diene known for use in the preparation of block copolymers provided that the conjugated diene has from four to eight carbon atoms, or mixtures thereof. Preferably, the conjugated diene used for the preparation of the conjugated diene blocks is a butadiene monomer and/or an isoprene monomer that is substantially pure monomer or contains minor proportions, up to 10% by weight of the conjugated diene block, of structurally related conjugated dienes, such as 2,3-dimethyl-1,3-butadiene, 1,3-pentadiene and 1,3-hexadiene. Preferably, substantially pure butadiene is utilized for the preparation of the conjugated diene blocks, with substantially pure butadiene being the most preferred.

These starting monomers for preparing a styrene-butadiene-styrene triblock copolymer are reacted by sequential polymerization or coupling. In sequential polymerization an amount of styrene monomer is anionically reacted in a solvent with an initiator to form a block of polystyrene. This process is repeated for butadiene. Butadiene monomer is added to the reactor and the polybutadiene attaches to the styrene block forming SB diblock copolymer. Lastly more styrene monomer is added to the reactor, and the styrene attaches to the SB block and forms another styrene block copolymer—SBS.

For coupling, SB is formed by the above process. Then the many polymerized SB diblock units are coupled together (SB)nX to form SBS, using a coupling agent, where X is the residue of a coupling agent as explained hereinafter, and n is a number equal to 2 for a triblock copolymer. For a multi-arm coupled block copolymer, n=3-6, or more depending on the desired number of SB arms.

An important starting material for anionic co-polymerizations is one or more polymerization initiators, as mentioned previously. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Preparation of radial (branched) polymers requires a post-polymerization step called "coupling". In the above radial formula for the selectively hydrogenated block copolymer, n is an integer of from 2 to about 30, preferably from about 2 to about 15, and more preferably 2-6. X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; CA Pat. 716,645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Coupling efficiency is of critical importance in the synthesis of block copolymers, which copolymers are prepared by a linking technology. In a typical anionic polymer synthesis, prior to the coupling reaction, the unlinked arm has only one hard segment (typically polystyrene). Two hard segments are required in the block copolymer if it is to contribute to the strength mechanism of the material. Uncoupled diblock arms dilute the strength forming network of a block copolymer that weakens the material. The very high coupling efficiency realized in the present invention is key to making high strength, coupled, block copolymers.

The coupling efficiency of the present invention is from about 40% to about 100%, and preferably from about 60% to about 95%.

It is well known in the art to modify the polymerization of the conjugated diene block to control the vinyl content. Broadly, this can be done by utilizing an organic polar compound such as an ether, including cyclic ethers, polyethers and thioethers or an amine including secondary and tertiary amines. Both non-chelating and chelating polar compounds can be used.

Among the polar compounds which may be added in accordance with one aspect of this invention are dimethyl ether, diethyl ether, ethyl methyl ether, ethyl propyl ether, dioxane, dibenzyl ether, diphenyl ether, dimethyl sulfide, diethyl sulfide, tetramethylene oxide (tetrahydrofuran), tripropyl amine, tributyl amine, trimethyl amine, triethyl amine, pyridine and quinoline and mixtures thereof.

In the present invention "chelating ether" means an ether having more than one oxygen as exemplified by the formula $R(OR')_m(OR'')_oOR$ where each R is individually selected from 1 to 8, preferably 2 to 3, carbon atom alkyl radicals; R' and R'' are individually selected from 1 to 6, preferably 2 to 3, carbon atom alkylene radicals; and m and o are independently selected integers of 1-3, preferably 1-2. Examples of preferred ethers include diethoxypropane, 1,2-dioxyethane (dioxo) and 1,2-dimethyoxyethane (glyme), or mixtures thereof. Other suitable materials include $-CH_3$, $-OCH_2$, $-CH_2$, and $-OCH_3$ (diglyme), or mixtures thereof "Chelating amine" means an amine having more than one nitrogen such as N,N,N',N'-tetramethylethylene diamine.

The amount of polar modifier is controlled in order to obtain the desired vinyl content in the conjugated diene block. The polar modifier is used in an amount of at least 0.1 moles per mole of lithium compound, preferably 1-50, more preferably 2-25 moles of polar modifier per mole of the lithium compound. Alternatively, the concentration can be expressed in parts per million by weight based on the total weight of solvent and monomer. Based on this criteria from 10 parts per million to about 1 wt. % (10,000 parts per million), and preferably 100 parts per million to 2000 parts per million are used. This can vary widely, however, since extremely small amounts of some of the preferred modifiers are very effective. At the other extreme, particularly with less effective modifiers, the modifier itself can be the solvent. Again, these techniques are well known in the art, disclosed for instance in Winkler, U.S. Pat. No. 3,686,366 (Aug. 22, 1972), Winkler, U.S. Pat. No. 3,700,748 (Oct. 24, 1972) and Koppes et al., U.S. Pat. No. 5,194,535 (Mar. 16, 1993), the disclosures of which are hereby incorporated by reference.

As used herein with regard to the block copolymers of the present invention, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

In one preferred embodiment, the block copolymer composition comprises a diblock of the formula A-B wherein A is styrene and B is butadiene and a linear triblock copolymer of the formula A-B-A wherein A is styrene and B is butadiene. In this embodiment, the peak molecular weight of the diblock copolymer is from about 48,000 to about 78,000, and the peak molecular weight of the linear triblock copolymer is from about 1.8 to about 2.5 times the peak molecular weight of the diblock copolymer. In this particular embodiment, both the diblock copolymer and the linear triblock copolymer have a vinyl content from about 50 to about 65 mol percent based on the number of repeat monomer units in the conjugated diene block of the specific copolymer, and a polystyrene content from about 20 to about 35 wt. %. The ratio of diblock copolymer to linear triblock copolymer is preferably from about 3:2 to about 10:1, more preferably from about 4:1 to about 7:3. The melt index will preferably range from greater than 15 g/10 min. to 50 g/10 minutes, more preferably from about 16 g/10 min. to about 35 g/10 min.

The peak molecular weight of the diblock copolymer will range from about 48,000 to about 78,000 and the peak molecular weight of the multiarm coupled block copolymer is from about 1.8 to about 5.0 times the peak molecular weight of the diblock copolymer. In this particular embodiment, both the diblock copolymer and the multiarm coupled block copolymer have a vinyl content from about 50 to about 65 mol percent based on the number of repeat monomer units in the conjugated diene block of the specific copolymer, and a polystyrene content from about 20 to about 35%. The ratio of diblock copolymer to multiarm coupled block copolymer is preferably from about 3:2 to about 10:1, more preferably from about 4:1 to about 7:3. The melt index will preferably range from greater than 15 g/10 min. to 50 g/10 min., more preferably from about 16 g/10 minutes to about 35 g/10 min.

It will be appreciated that the term "vinyl content" has been used to describe the polymer product that is made when 1,3-butadiene is polymerized via a 1,2-addition mechanism. The result is a monosubstituted olefin group pendant to the polymer backbone, a vinyl group. When referring to the use of butadiene or isoprene as the conjugated diene monomer, it is preferred that the vinyl content is at least 35-80 mol percent of the condensed butadiene units in the polymer block have a 1,2-addition configuration or 3,4 for the isoprene units in the polymer block. Preferably, from about 46 to about 70 mol percent of the condensed butadiene units should have 1,2-addition configuration or 3,4 for the isoprene units in the polymer block. Even more preferably from about 50 to about 65 mol percent of the butadiene units should have 1,2-addition configuration or 3,4 for the isoprene units in the polymer block.

The monovinyl aromatic hydrocarbon content of the copolymers (in the present case with regard to each individual diblock copolymer, linear triblock copolymer or multiarm coupled block copolymer) is suitably from about 10 to about 55% by weight, based on the total block copolymer. Preferably, the content of monovinyl aromatic hydrocarbon of the copolymers will be from about 15 to about 45% by weight, more preferably from about 22 to about 37% by weight, and most preferably from about 25 to about 35% by weight, based on the total weight of the copolymer.

In compositions of this application, the amount of the styrenic block copolymer ranges from about 5 to about 50 wt. % of the composition, and specifically for a pressure sensitive adhesives from about 23 to about 32 wt. % of the composition, and 5 to about 20 wt. % of the composition for thermoset applications. For tackifier the amount ranges from about 10 to about 75 wt. % of the composition. For oil the amount ranges from 0 to 45 wt. % of the composition. And for antioxidants (heat stabilizers) the amount ranges from 0 to about 3 wt. % of the composition.

One of the components used in the adhesives and sealants of the present invention is a tackifying resin. Tackifying resins include both A block compatible resins and B block compatible resins. The A block compatible resin may be selected from the group consisting of coumarone-indene resin, rosen ester resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether) or mixture of two or more of these. Such resins are e.g. sold under the trademarks "HERCURES", "ENDEX", "KRISTALEX", "NEVCHEM", "SYLVALITE" and "PICCOTEX". The preferred A block compatible tackifying resin is a rosin ester tackifying resin sold under the trade name "SYLVALITE." Resins compatible with the B block maybe selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosin esters, rosin derivatives and mixtures thereof. These resins are sold under the trademarks "REGALITE", "REGALREZ", "ESCOREZ", "WINGTACK", "SLYVARES" and "ARKON". The preferred B block compatible tackifying resin is a terpene ester tackifying resin sold under the trade name "SLYVARES." The compositions of the present invention can have a combination of resins compatible with A blocks and/or B blocks.

The amount of tackifier varies from about 10 to about 75 wt. % depending on the type of tackifier. For rosin ester resins the amount of tackifier is from about 10 to about 75 wt. % based on the weight of the composition. For terpene tackifier resins the amount ranges from about 0 to about 75 wt. % based on the weight of the composition. More preferably, the amount of tackifier in the hot melt pressure sensitive adhesive is from about 30 to about 60 wt. % of a rosin ester tackifier resin and from about 5 to about 25 wt. % of a terpene tackifier resin, based on the weight of the composition.

Another one of the components used in the adhesive compositions of the present invention is an extending oil. Especially preferred are the types of oils that are compatible with the B blocks. While oils of higher aromatic content are satisfactory, those petroleum-based white oils having less than 50% aromatic content are preferred. Such oils include both paraffinic and naphthenic oils. The oils should additionally have low volatility, preferably having an initial boiling point above about 500° F.

Examples of alternative extending oils which may be used in the present invention are oligomers of randomly or sequentially polymerized styrene and conjugated diene, oligomers of conjugated diene, such as butadiene or isoprene, liquid polybutene-1, and ethylene-propylene-diene rubber, all having a number average molecular weight in the range from 300 to 35,000, preferable less than about 25,000 molecular weight. The amount of oil employed varies from about 0 to about 45 wt. % of the composition, preferably from about 10 to about 35 wt. % of the composition.

Endblock reinforcers such as endblock compatible resins like ENDEX® 160 can also be added to protect the adhesive from degradation induced by heat, light and processing or during storage. Several types of antioxidants can be used, either primary antioxidants like hindered phenols or secondary antioxidants like phosphite derivatives or blends thereof.

Antioxidants may also be added to the composition of the present invention. Examples of commercially available antioxidants include IRGANOX® 565 from Ciba-Geigy (2.4-bis-(n-octylthio)-6-(4-hydroxy-3,5-di-tertiary-butyl anilino)-1,3,5-triazine), IRGANOX® 1010 from Ciba-Geigy (tetrakis-ethylene-(3,5-di-tertiary-butyl-4-hydroxy-hydrocinnamate)methane) and POLYGARD® HR from Uniroyal (tris-(2,4-di-tertiary-butyl-phenyl)phosphite). Other antioxidants developed to protect the gelling of the polybutadiene segments can also be used, such as SUMILIZER® GS from Sumitomo (2[1-(2-hydroxy-3,5-di-terpentylphenyl)ethyl)]-4,6-di-tert-pentylphenylacrylate); SUMILIZER® T-PD from Sumitomo (pentaerythrythyltetrakis(3-dodecylthiopropionate)); or mixtures thereof.

In the hot-melt adhesive compositions of the present invention, one or more stabilizers and/or antioxidants are optionally present. Accordingly, the one or more stabilizers and/or antioxidants are present in an amount from about 0 to about 1 wt. %.

Examples

TABLE 1

| Raw Material | Comp. Ex. 1 | Comp. Ex. 2 | Comp. Ex. 3 | Comp. Ex. 4 | Comp. Ex. 5 |
|---|---|---|---|---|---|
| Kraton SBS | 10 | 10 | 10 | | |
| Polymer A | | | | 28 | |
| Solprene 1205 (SB block copolymer) | 15 | 15 | 15 | | |
| Taipol 1307 (SIS block copolymer) | N/A | | | | 28 |
| Nyflex 222B (naphthenic oil) | 15 | 15 | 15 | 20 | 14 |
| Escorrez 1310 LC (tackifying resin) | | | | | 28.75 |
| Syvalite RE 100L (tackifying resin) | 39.5 | 39.5 | 39.5 | | 28.75 |
| Escorez 2394 (tackifying resin) | N/A | | 20 | | |
| Escorez 2596 (tackifying resin) | 20 | | | | |
| Wingtack 86 (tackifying resin) | N/A | 20 | | | |
| Irganox B-225 (antioxidant) | 0.5 | 0.5 | 0.5 | | 0.5 |
| Sylvalite re85 L (tackifying resin) | | | | 36.5 | |
| Slyvarez ZT 105lt (tackifying resin) | | | | 15 | |
| Irganox 1010 (antioxidant) | | | | .5 | |
| Viscosity | 13100 @300° F. | 13820 @300° F. | 13120 @300° F. | 2360 @350° F. | 12500 @300° F. |

Table 1 shows compositions for various hot melt pressure sensitive adhesives. Examples 1-3 are a comparative adhesive composed of a conventional SBS triblock copolymer available from Kraton, and a SB diblock copolymer with tackifying resins, oil, and adhesives. Example 4 is an adhesive composed of Polymer A, which is the block copolymer claimed herein, including tackifying resins, oil, and an antioxidant. The comparative Example 5 is composed of an SIS block copolymer and tackifying resins, oil, and an antioxidant. Example 4, utilizing a high diblock, high vinyl, SBS block copolymer as further described herein has a viscosity much lower than Comparative Examples 1-3 and Comparative Example 5.

In an alternative embodiment of the present invention, the present invention may be converted into a thermoset gel by exposure to ionizing or non-ionizing radiation, heat, or both. The thermoset composition comprises from about 5 to about 20 wt. % of an unsaturated block copolymer Polymer A; from about 45 to about 65 wt. % of a tackifying resin, such as Sylvalite RE85L; from about 25 to about 75 wt. % of a tackifying resin, such as Slyvarez ZT 105lt; from about 0 to about 10 wt. % of a naphthenic oil, such as Nyflex 222B; and from about 0 to about 1 wt. % of an antioxidant, such as Irganox 1010.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

The invention claimed is:

1. A hot melt pressure sensitive adhesive, comprising:
   from about 20 to about 35 wt. % of a block copolymer composition comprising (i) a diblock copolymer comprising one block of a monovinylaromatic hydrocarbon, an A block, and one block of a conjugated diene, a B block, having a peak molecular weight from 30,000 to 78,000 and a vinyl content from 35 to 80 mol percent based on the number of repeat monomer units in the conjugated diene block, and (ii) a block copolymer comprising at least two blocks of monovinylaromatic hydrocarbon and at least one block of conjugated diene, the block copolymer selected from the group consisting of linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the melt index for the block copolymer composition is from about 20 g/10 min. to about 35 g/10 min. as determined by ASTM D-1238, condition G (200° C., 5 kg) and wherein the ratio of (i) to (ii) in the block copolymer composition is greater than 1:1;
   from about 30 to about 60 wt. % of a tackifying resin;
   from about 0 to about 45 wt. % of an oil; and
   from about 0 to about 3 wt. % of an antioxidant,
   wherein said wt. % is based on the total weight of the hot melt pressure sensitive adhesive.

2. The hot melt pressure sensitive adhesive according to claim 1, wherein the block copolymer (ii) has a polystyrene content (PSC) within a range of from about 10 to about 55 wt. %.

3. The hot melt pressure sensitive adhesive according to claim 1, further comprising an unsaturated block copolymer.

4. The hot melt pressure sensitive adhesive according to claim 1, wherein said oil is a paraffinic and/or naphthenic processing oil.

5. The hot melt pressure sensitive adhesive according to claim 1, wherein the tackifying resin is compatible with the B block and is selected from the group consisting of $C_5$ hydrocarbon resins, hydrogenated $C_9$ hydrocarbon resins, rosin esters, and styrenated terpene resins.

6. The hot melt pressure sensitive adhesive according to claim 5, wherein the tackifying resin is a rosin ester tackifier resin or a terpene tackifier resin.

7. The hot melt pressure sensitive adhesive according to claim 1, wherein the tackifying resin is compatible with the A block and is selected from the group consisting of coumarone-indene rosin, polyindene resin, poly(methyl indene) resin, polystyrene resin, vinyltoluene-alphamethylstyrene resin, alphamethylstyrene resin and polyphenylene ether.

8. The hot melt pressure sensitive adhesive according to claim 1, wherein the amount of block copolymer composition is from about 23 to about 32 wt. %.

9. The hot melt pressure sensitive adhesive according to claim 1, wherein the oil is present in an amount of from about 10 to 35 wt. %.

10. The hot melt pressure sensitive adhesive according to claim 1, wherein the block copolymer (ii) has a vinyl content of about 46 mol % to about 70 mol %.

11. The thermoset according to claim 1, wherein the oil is a naphthenic processing oil present in an amount of from about 0 to about 10 wt. %.

* * * * *